US012567751B2

(12) United States Patent
Yvenat et al.

(10) Patent No.: US 12,567,751 B2
(45) Date of Patent: Mar. 3, 2026

(54) FORMATION PROCESS FOR A POTASSIUM-ION HYBRID SUPER-CAPACITOR

(71) Applicant: COMMISSARIAT A L'ENERGIE ATOMIQUE ET AUX ENERGIES ALTERNATIVES, Paris (FR)

(72) Inventors: Marie-Eve Yvenat, Grenoble cedex (FR); Philippe Azais, Grenoble cedex (FR); Benoît Chavillon, Grenoble cedex (FR); Eric Mayousse, Grenoble cedex (FR); Fabien Perdu, Grenoble cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 744 days.

(21) Appl. No.: 17/940,179

(22) Filed: Sep. 8, 2022

(65) Prior Publication Data

US 2023/0077860 A1 Mar. 16, 2023

(30) Foreign Application Priority Data

Sep. 13, 2021 (FR) ...................................... 21 09574

(51) Int. Cl.
*H01G 11/60* (2013.01)
*H01G 11/62* (2013.01)
*H02J 7/34* (2006.01)

(52) U.S. Cl.
CPC .............. *H02J 7/345* (2013.01); *H01G 11/60* (2013.01); *H01G 11/62* (2013.01)

(58) Field of Classification Search
CPC .. H01G 9/0029; H01G 9/0032; H01G 9/0036; H01G 11/84; H01G 11/86; H01G 11/60; H01G 11/62; H01G 11/02; H01G 11/32; H01G 11/04; H01G 11/06
See application file for complete search history.

(56) References Cited

U.S. PATENT DOCUMENTS

| | | | |
|---|---|---|---|
| 6,087,043 A | 7/2000 | Tossici et al. | |
| 2012/0115035 A1 | 5/2012 | Ota et al. | |
| 2016/0049661 A1 | 2/2016 | Ota et al. | |
| 2018/0254524 A1 | 9/2018 | Zhang et al. | |
| 2019/0035560 A1* | 1/2019 | Umetsu .................. | H01G 11/50 |
| 2019/0280299 A1 | 9/2019 | Komaba et al. | |
| 2020/0067055 A1* | 2/2020 | Murakami ............. | C08J 9/0066 |
| 2021/0358695 A1 | 11/2021 | Komaba et al. | |

FOREIGN PATENT DOCUMENTS

| | | |
|---|---|---|
| CN | 106797022 A | 5/2017 |
| CN | 111584248 A | 8/2020 |
| DE | 10 2018 105 613 A1 | 9/2019 |
| EP | 3 534 443 A1 | 9/2019 |
| EP | 3 848 949 A1 | 7/2021 |
| FR | 3 005 199 A1 | 10/2014 |
| JP | 2020-145061 A | 9/2020 |
| WO | WO 2016/059907 A1 | 4/2016 |
| WO | WO 2016/168496 A1 | 10/2016 |
| WO | WO 2018/135627 A1 | 7/2018 |
| WO | WO 2020/125560 A1 | 6/2020 |

OTHER PUBLICATIONS

Wen-zhe Zhang et al., "Salt-assisted in-situ formation of N-doped porous carbons for boosting K+ storage capacity and cycling stability", New Carbon Materials, vol. 36, Issue 1, Feb. 2021 (10 pages). (Year: 2021).*
Ziqiang Xu et al., "Direct Structure-Performance Comparison of All-Carbon Potassium and Sodium Ion Capacitors", Advance Science, 6, 1802272, 2019 (13 pages). (Year: 2019).*
Yuanji Wu et al., "Recent advances in potassium-ion hybrid capacitors: Electrode materials, storage mechanisms and performance evaluation", Energy Storage Materials, 41, 2021 (25 pages). (Year: 2021).*
Meiqi Liu et al., "Emerging Potassium-ion Hybrid Capacitors", ChemSusChem, 13, 2020 (26 pages). (Year: 2020).*
Xiang Hu et al., "Hierarchical porous carbon nanofibers for compatible anode and cathode of potassium-ion hybrid capacitor", Energy & Environmental Science, vol. 13, No. 8, 2020 (11 pages). (Year: 2020).*
Jihui Lang et al., "A Flexible Potassium-Ion Hybrid Capacitor with Superior Rate Performance and Long Cycling Life", Applied Materials & Interfaces, 12, 2020 (8 pages). (Year: 2020).*
French Preliminary Search Report issued Jun. 28, 2022 in French Application 21 09574 filed on Sep. 13, 2021, 3 pages (with English Translation of Categories of Cited Documents).

* cited by examiner

*Primary Examiner* — Scott B Geyer
(74) *Attorney, Agent, or Firm* — Oblon, McClelland, Maier & Neustadt, L.L.P.

(57) ABSTRACT

A process may form a potassium-ion hybrid super-capacitor. Such a process may include: charging a potassium-ion hybrid supercapacitor including (i) a negative electrode comprising graphite, (ii) a positive electrode comprising activated carbon, and (ii) an electrolyte comprising a potassium salt, at constant current in a protocol of between Cx/50 and Cx/2, to a charge cutoff voltage of between 3.0 V and 3.3 V; holding the supercapacitor at the charge cutoff voltage until the leakage current is between Cx/2000 and Cx/500; and discharging the supercapacitor at constant current in a protocol of between Cx/50 and Cx, to a discharge cutoff voltage of between 0 V and 2 V, wherein the process further includes degassing the supercapacitor after the charging, the holding, or the discharging.

20 Claims, 2 Drawing Sheets

FORMATION PROCESS FOR A POTASSIUM-ION HYBRID SUPER-CAPACITOR

CROSS-REFERENCE TO RELATED APPLICATIONS

The present application is the claims the benefit of the filing date of French Appl. No. 21 09574, filed on Sep. 13, 2021, the content of each of which is incorporated by reference.

TECHNICAL FIELD

The present invention relates to a formation process for a potassium-ion hybrid supercapacitor.

PRIOR ART

The power density and energy density supplied by supercapacitors, as energy storage devices, are midway between those supplied by electrochemical batteries and by conventional electrolytic capacitors. Supercapacitors also return energy more rapidly than an electrochemical battery.

In known symmetrical supercapacitors, the positive and negative electrodes are based on activated carbon and the electrolyte is based on tetraethylammonium tetrafluoroborate ($TEABF_4$). These symmetrical supercapacitors have a high power density and high cyclability but a low energy density, associated with the medium capacity of the supercapacitor (which is of the order of 8 Wh/kg) and with the operating voltage.

To meet the demand for an increase in energy density, supercapacitors were developed that lie between the symmetrical supercapacitors conventionally used, based on activated carbon, and batteries. Such capacitors are referred to as asymmetric or hybrid. One of the electrodes—conventionally, the negative electrode—is specifically formed from a rechargeable battery material, and the other—conventionally, the positive electrode—is formed on the basis of activated carbon, and the electrolyte situated between these two electrodes is conventionally aqueous and generally comprises lithium salts in solution.

Charge storage in a hybrid supercapacitor takes place at the negative electrode via a redox reaction, whereas charge storage at the positive electrode takes place via the formation of an electrochemical double layer.

Patent application FR 3 005 199 A1 describes an example of a hybrid supercapacitor said to be a potassium-ion supercapacitor, comprising a negative electrode comprising graphite, a positive electrode comprising activated carbon, and an electrolyte comprising at least one potassium salt.

The first usage cycles, referred to as "formation" cycles, of an electrochemical system such as a hybrid supercapacitor are essential in ensuring effective long-term operation of the supercapacitor.

The reference formation used to date, corresponding to 5 charge/discharge cycles at $C_x$ or $5C_y$ (where $C_x$ and $C_y$, respectively, are the formation capacity of the intercalation compound $KC_8$ and the capacity of the cell) from 0.5 to 3.5 V, gives rise to scatter and to instability in the cycling performance, with discharged capacities that reduce and then increase drastically in several thousand cycles, to reach values very much greater than the symmetrical supercapacitors.

Applications WO 2016/168496 A1, WO 2016/059907 A1, CN 106797022 A, US 2018/254524 A1 and DE 10 2018

105613 A1 describe electrode formulations and electrolyte compositions for functional systems based on potassium, such as potassium-ion batteries, and potassium-ion hybrid capacitors and even supercapacitors, albeit without specifying the formation step for the electrodes.

Application WO 2020/125560 A1 describes a preliminary potassiation step which comprises using potassium metal in order to produce a passivation layer of potassium on the surface of the negative electrode, which comprises graphite.

Exposition of the Invention

There is therefore a need for enhancing the stability and the reproducibility of the cycling performance of potassium-ion supercapacitors in a manner which should be simple and inexpensive to implement.

SUMMARY OF THE INVENTION

The subject of the invention is therefore a formation process for a potassium-ion hybrid supercapacitor, the process comprising:

a) supplying the potassium-ion hybrid supercapacitor comprising:
  a negative electrode comprising graphite,
  a positive electrode comprising activated carbon,
  an electrolyte comprising at least one potassium salt, b) charging the supercapacitor at constant current in a protocol of between $C_x/50$ and $C_x/2$ or between $C_y/10$ and $2.5C_y$, to a charge cutoff voltage of between 3.0 V and 3.3 V, where $C_x$ is the formation capacity of the intercalation compound $KC_8$ and $C_y$ is the capacity of the electrolytic cell, c) holding the supercapacitor at the charge cutoff voltage until the leakage current is between $C_x/2000$ and $C_x/500$, d) discharging the supercapacitor at constant current in a protocol of between $C_x/50$ and $C_x$ or between $C_y/10$ and $5C_y$, to a discharge cutoff voltage of between 0 V and 2 V, preferably equal to 0.5 V, where the process further comprises degassing the supercapacitor after one of steps b) to d).

Holding a supercapacitor under direct voltage is commonly used for keeping it in the charged state, by compensating the self-discharge phenomena, and therefore for simulating its ageing and observing the drop in its cycling performance. Surprisingly, and contrary to all expectations, the inventors have found that holding the supercapacitor under direct voltage by means of the process according to the invention enables cycling performance to be obtained which is reproducible and stable, especially in the long term, with high energy densities, in particular, of greater than 12 $Wh/kg_{electrochemical\ core}$.

The process according to the invention is, moreover, a low-cost process which is easy to implement, with a limited number of steps. Furthermore, it does not require a complex step of preliminary potassiation as described in the prior art.

The positive electrode is the site of the formation of the electrochemical double layer. The negative electrode is the site of a redox reaction which involves intercalation of the potassium present in the electrolyte. For example, the intercalation may take place such that the potassium composition is at most equal to $KC_8$, for example, ranging from $KC_{64}$ to $KC_8$ and advantageously corresponding to $KC_{48}$ or to $KC_{16}$.

The formation capacity of the intercalation compound $KC_8$, referred to as $C_x$, is equal to 5 times the capacity of the electrolytic cell $C_y$. The electrolytic cell comprises the negative electrode, the positive electrode and the electrolyte.

The voltage of the potassium-ion hybrid supercapacitor of step a) may be between 50 mV and 500 mV, preferably between 100 mV and 300 mV.

The charge cutoff voltage of step b) is preferably between 3.1 V and 3.3 V, being for example 3.2 V.

The time in step c) for which the supercapacitor is held at the charge cutoff voltage is preferably between 22 hours and 26 hours, and for example is 24 hours.

At least one and preferably all of steps b) to d) may be implemented at a temperature of between 15° C. and 30° C., preferably between 20° C. and 25° C., better still between 21° C. and 24° C., for example at a temperature of 23° C. It is possible thereby to implement the process according to the invention without a step of heating the potassium-ion hybrid supercapacitor.

The charging in step b) may be carried out in a protocol of between $C_x/15$ and $C_x/5$ or between $C_y/3$ and $C_y$, preferably in a $C_x/10$ or $C_y/2$ protocol.

The discharging in step d) may be carried out in a protocol of between $C_x/15$ and $C_x/5$ or between $C_y/3$ and $C_y$, preferably in a $C_x/10$ or $C_y/2$ protocol.

The hold time in step c) may be between 15 hours and 30 hours, or even between 20 hours and 28 hours, in particular 24 hours.

The leakage current at the end of step c) may be between $C_x/2000$ and $C_x/500$ or between $C_y/400$ and $C_y/100$, and is preferably equal to $C_x/1000$ or $C_y/200$.

Degassing

Degassing is the removal of some or all of the gas or gases present within the potassium-ion hybrid supercapacitor. These one or more gases may have been produced in step b), c) and/or d). They may be electrochemical reaction products associated with the formation of a passivation layer on the negative electrode and/or with secondary reactions between the electrolyte and the functional groups of the positive electrode.

The degassing step limits premature ageing of the supercapacitor. It is able in particular to prevent the pores of the electrode being filled with gas and becoming non-functional, the consequence of which would be a sharp drop in performance of the supercapacitor.

The degassing of the supercapacitor may be carried out after each of steps b) to d).

In particular, the degassing of the supercapacitor may be carried out after step d).

Positive Electrode

The positive electrode is preferably a capacitive electrode.

The positive electrode is preferably porous.

Negative Electrode

The graphite of the negative electrode is preferably capable of intercalating potassium. It may in particular comprise particulate graphite having a median particle size of 50 μm, this particle size being measured by D50 laser particle size analysis.

The potassium therefore has the capacity for intercalation into the graphite of the negative electrode, at high charge states, such that the composition corresponds at most to $KC_8$.

Electrolyte

The electrolyte is preferably non-aqueous.

The at least one potassium salt present in the electrolyte may be in solution in at least one organic solvent.

The at least one potassium salt may be selected from $KClO_4$, $KBF_4$, $KPF_6$, potassium bis(trifluoromethane-sulfonyl)imide (known by the abbreviation KTFSI), potassium bis(fluorosulfonyl)imide (known by the abbreviation KFSI), potassium bis(oxalato)borate (known by the abbreviation KBOB), KSCN, $KSbF_6$, $KAsF_6$, $KAlCl_4$, $KSiF_6$, $KSO_3CF_3$ and mixtures thereof, and preferably selected from $KClO_4$, $KBF_4$, $KPF_6$ and mixtures thereof.

The at least one potassium salt present in the electrolyte may be in solution in at least one solvent selected from carbonate solvents, linear ether solvents, nitrile solvents, lactone solvents, amide solvents and mixtures thereof, and preferably selected from propylene carbonate, ethylene carbonate, diethyl carbonate, dimethyl carbonate, dimethoxyethane, acetonitrile, γ-butyrolactone, dimethylformamide and mixtures thereof.

BRIEF DESCRIPTION OF THE DRAWINGS

The invention may be appreciated more fully from a reading of the detailed description hereinafter of implementation examples which are not limiting on said invention, and from examination of the appended drawing, in which.

DETAILED DESCRIPTION

FIGS. 1 to 4 show cycling performance results for a potassium-ion hybrid supercapacitor which has undergone a formation process outside of or according to the invention. The curves represent the energy density measured as a function of the number of cycles. In these tests, cycling is performed in a $20C_x$ or $100C_y$ protocol.

Figures 1, 2:
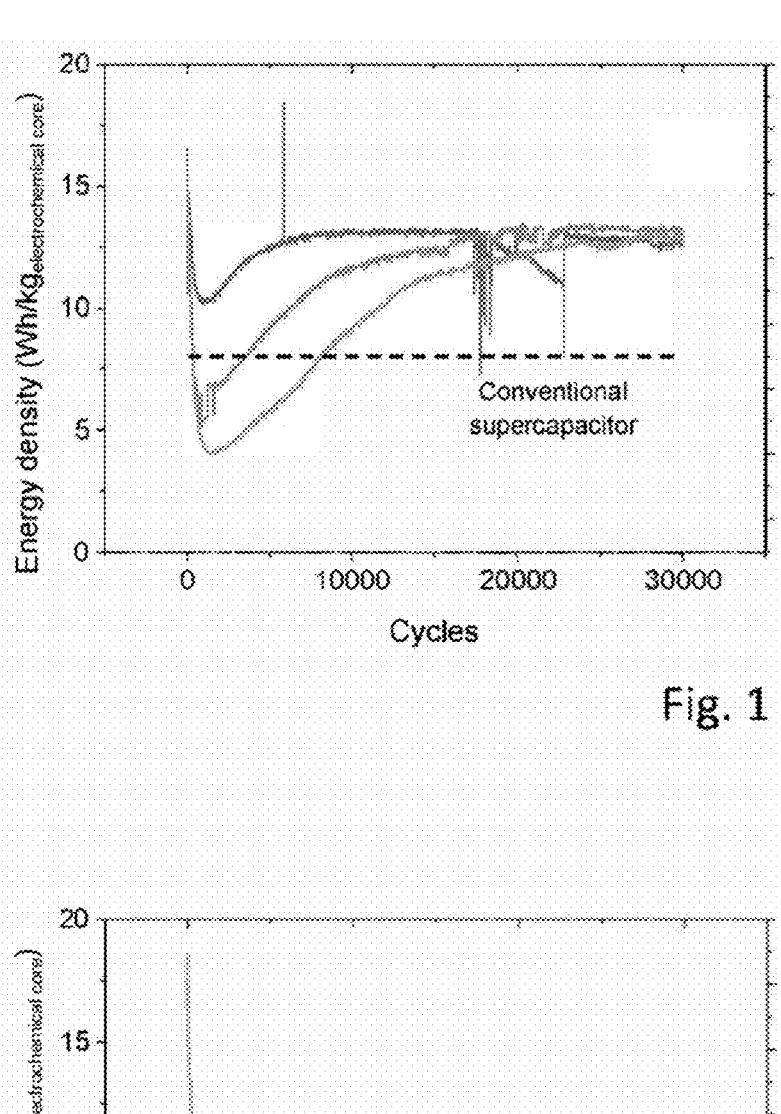
FIG. 1 shows cycling performance results for a potassium-ion hybrid supercapacitor which has undergone a formation process outside of the invention.
FIG. 2 shows cycling performance results for a potassium-ion hybrid supercapacitor which has undergone another formation process outside of the invention.

FIG. 1 shows the cycling performance results of three potassium-ion hybrid supercapacitors which have undergone the same reference formation process outside of the invention.

In these tests, the reference formation process used corresponds to five charge/discharge cycles at $C_x$ or $5C_y$ from 0.5 to 3.5 V.

It is seen in FIG. 1 that the three curves give rise to scattering and to instability of the cycling performance, with energy densities which decrease and then increase drastically in several thousand cycles to reach energy density values of between 12 and 13 Wh/kg$_{electrochemical\ core}$, these being values which are very much greater than those obtained with the symmetrical—also called conventional—supercapacitors, which are of the order of 8 Wh/kg$_{electrochemical\ core}$.

FIG. 2 shows the cycling performance results for three potassium-ion hybrid supercapacitors which have undergone the same formation process outside of the invention, consisting of first cycles performed in a $C_x/10$ or $C_y/2$ protocol and at a temperature of approximately 23° C.

It is seen in FIG. 2 that the curves are reproducible and therefore that the scattering observed in FIG. 1 is significantly reduced. The energy density values are nevertheless between 10 and 11 Wh/kg$_{electrochemical\ core}$ and are lower than the values obtained in FIG. 1. Moreover, the long-term cycling performance of the supercapacitor remains unstable.

Figure 3:
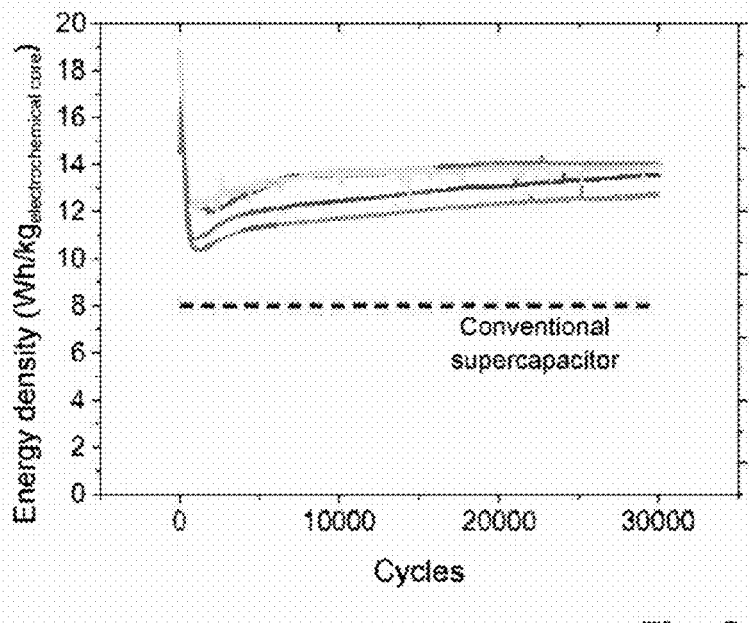
FIG. 3 shows cycling performance results for a potassium-ion hybrid supercapacitor which has undergone a formation process according to the invention.

FIG. 3 shows the cycling performance results for four potassium-ion hybrid supercapacitors which have undergone the same implementation example of the formation process according to the invention.

In these tests, the implementation example of the formation process according to the invention that is used comprises the succession:

of charging the supercapacitor at constant current in a $C_x/10$ or $C_y/2$ protocol to a charge cutoff voltage of 3.2 V, of holding the supercapacitor at the charge cutoff voltage of 3.2 V for a hold time of 24 hours, of discharging the supercapacitor to a discharge cutoff voltage of 0.5 V, and of degassing the supercapacitor.

It is seen in FIG. 3 that the curves are both reproducible and stable, with high energy density values, of between 12 and 14 $Wh/kg_{electrochemical\ core}$.

Figure 4:
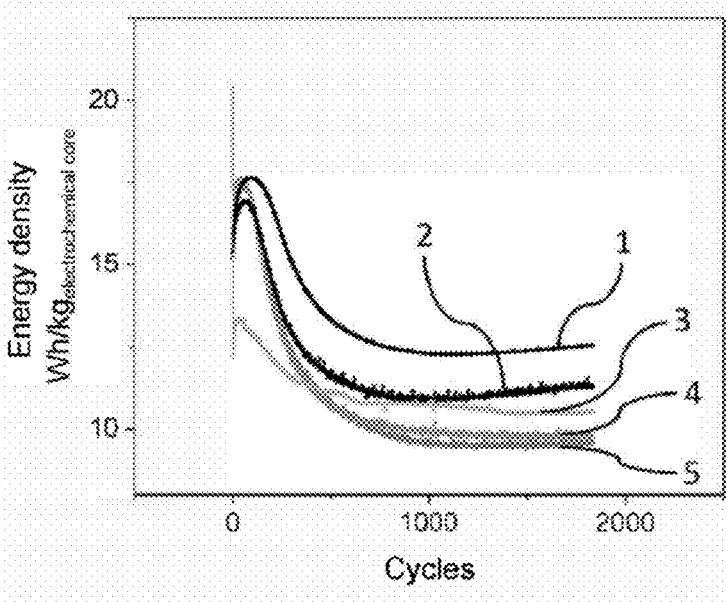
FIG. 4 shows results of comparative tests evaluating the effect of each step of the process according to the invention.

FIG. 4 shows the results of comparative tests evaluating the effect of each step of the process according to the invention.

The key to FIG. 4 is as follows.

Curve 1 corresponds to an implementation example of the process according to the invention.

Curve 2 corresponds to an implementation example of the process according to the invention without step b).

Curve 3 corresponds to an implementation example of the process according to the invention without the degassing.

Curve 4 corresponds to an implementation example of the process according to the invention without step b), which is replaced by a step of charging the supercapacitor at constant current in a protocol of more than $C_x/2$ (5 mA), to a charge cutoff voltage of between 3.0 V and 3.3 V.

Curve 5 corresponds to an implementation example of the process according to the invention without step c), which is replaced by a step of holding the supercapacitor at the charge cutoff voltage until the leakage current is equal to 10 μA.

It is seen in FIG. 4 that the best cycling performance, in terms of energy density, stability and reproducibility, is obtained with curve 1, which corresponds to an implementation example of the formation process according to the invention. The tests show, indeed, that the energy density values for curves 2 to 5 do not exceed 12 $Wh/kg_{electrochemical\ core}$ over the long term.

The invention is of course not limited to the implementation example of the process, which is given for the purpose of illustration and is non-limiting.

The invention claimed is:

1. Formation-A process for forming a potassium-ion hybrid super-capacitor, the process comprising:

charging the potassium-ion hybrid supercapacitor comprising (i) a negative electrode comprising graphite, (ii) a positive electrode comprising activated carbon, and (iii) an electrolyte comprising a potassium salt, at constant current in a protocol-range of from $Cy/10$ to $5C_y/2$, to a charge cutoff voltage in a range of from 3.0 to 3.3 V, C, being a formation capacity of an intercalation compound $KC_8$, holding the potassium-ion hybrid supercapacitor at the charge cutoff voltage until a leakage current is in a range of from $C_y/400$ to $C_y/100$, discharging the potassium-ion hybrid supercapacitor at constant current in a range of from $C_y/10$ to $5C_y$, to a discharge cutoff voltage in a range of from 0 to 2 V; and, degassing the supercapacitor after the charging, the holding, or the discharging.

2. The process of claim 1, wherein the charging the holding, and/or the discharging is implemented at a temperature in a range of from 15° C. to 30° C.

3. The process of to claim 2, wherein each of the charging, the holding, and the discharging are implemented at a temperature in a range of from 15° C. to 30° C.

4. The process of claim 1, wherein the charging and the discharging are carried out in a protocol range of from $C_y/3$ to $C_y$.

5. The process of claim 4, wherein the charging and the discharging are carried out at $C_y/2$.

6. The process of claim 1, wherein the hold time the holding is in a range of from 20 to 28 hours.

7. The process of claim 6, wherein the hold time in the holding is 24 hours.

8. The process of claim 1, wherein the leakage current at the end of the discharging is $C_y/200$.

9. The process of claim 1, wherein the degassing of the supercapacitor is carried out after the discharging.

10. The process of claim 1, wherein the electrolyte is non-aqueous.

11. The process of claim 1, wherein the potassium salt present in the electrolyte is in solution comprising an organic solvent.

12. The process of claim 1, wherein the potassium salt present in the electrolyte comprises $KClO_4$, $KBF_4$, $KPF_6$, potassium bis(trifluoromethanesulfonyl)imide, potassium bis(fluorosulfonyl)imide, potassium bis(oxalato) borate, KSCN, $KSbF_6$, $KAsF_6$, $KAlCl_4$, $KSiF_6$, and/or $KSO_3CF_3$.

13. The process of claim 12, wherein the potassium salt present in the electrolyte comprises $KClO_4$, $KBF_4$, and/or $KPF_6$.

14. The process of claim 12, wherein the potassium salt is in solution comprising a carbonate, linear ether, nitrile, lactone, and/or amide solvents.

15. The process of claim 14, wherein the solvent comprises propylene carbonate, ethylene carbonate, diethyl carbonate, dimethyl carbonate, dimethoxyethane, acetonitrile, γ-butyrolactone, and/or dimethylformamide.

16. The process of claim 1, wherein the charging, the holding, and/or the discharging is implemented at a temperature in a range of from 15 to 30° C., and wherein the charging and the discharging are carried out in a range of from $C_y/3$ to $C_y$.

17. The process of claim 1, wherein each of the charging, the holding, and the discharging are implemented at a temperature in a range of from 15 to 30° C., and wherein the charging and the discharging are carried out in a range of from $C_y/3$ to $C_y$.

18. The process of claim 1, wherein the potassium salt present in the electrolyte comprises $KClO_4$.

19. The process of claim 1, wherein the potassium salt present in the electrolyte comprises $KBF_4$.

20. The process of claim 1, wherein the potassium salt present in the electrolyte comprises $KPF_6$.

* * * * *